(12) United States Patent
Coronado

(10) Patent No.: US 7,570,858 B2
(45) Date of Patent: Aug. 4, 2009

(54) OPTICAL FIBER FOR PUMPING AND METHOD

(75) Inventor: Martin P. Coronado, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/950,790

(22) Filed: Dec. 5, 2007

(65) Prior Publication Data

US 2009/0148110 A1   Jun. 11, 2009

(51) Int. Cl.
   *G02B 6/036* (2006.01)
(52) U.S. Cl. .................................................... 385/128
(58) Field of Classification Search ........................ None
See application file for complete search history.

(56) References Cited

U.S. PATENT DOCUMENTS

| | | | |
|---|---|---|---|
| 5,348,097 | A | 9/1994 | Giannesini et al. |
| 6,012,517 | A | 1/2000 | Schuring et al. |
| 6,065,540 | A | 5/2000 | Thomeer et al. |
| 6,257,332 | B1 | 7/2001 | Vidrine et al. |
| 6,764,365 | B2 * | 7/2004 | Quigley et al. ............... 441/133 |
| 6,857,486 | B2 | 2/2005 | Chitwood et al. |
| 6,866,448 | B2 | 3/2005 | Finzel et al. |
| 6,868,906 | B1 | 3/2005 | Vail, III et al. |
| 6,923,273 | B2 | 8/2005 | Terry et al. |
| 6,979,776 | B1 | 12/2005 | Zimmermann |
| 7,032,658 | B2 | 4/2006 | Chitwood et al. |
| 7,036,610 | B1 | 5/2006 | Vail, III |
| 7,066,284 | B2 | 6/2006 | Wylie et al. |
| 2004/0134662 | A1 * | 7/2004 | Chitwood et al. ........... 166/367 |
| 2005/0109518 | A1 | 5/2005 | Blacklaw |
| 2006/0120675 | A1 * | 6/2006 | Goldner et al. ............. 385/104 |

OTHER PUBLICATIONS

Restarick, Henry; "Horizontal Completion Options in Reservoirs With Sand Problems"; SPE29831; SPE Middle East Oil Show, Bahrain; Mar. 11-14, 1995; pp. 545-560.

* cited by examiner

*Primary Examiner*—Uyen-Chau N Le
*Assistant Examiner*—Chris Chu
(74) *Attorney, Agent, or Firm*—Cantor Colburn-LLP

(57) ABSTRACT

A fiber optic cable includes at least one optic fiber; and a buoyancy modifying coating on the at least one optic fiber, the coating comprising at least one microballoon and a matrix material.

4 Claims, 1 Drawing Sheet

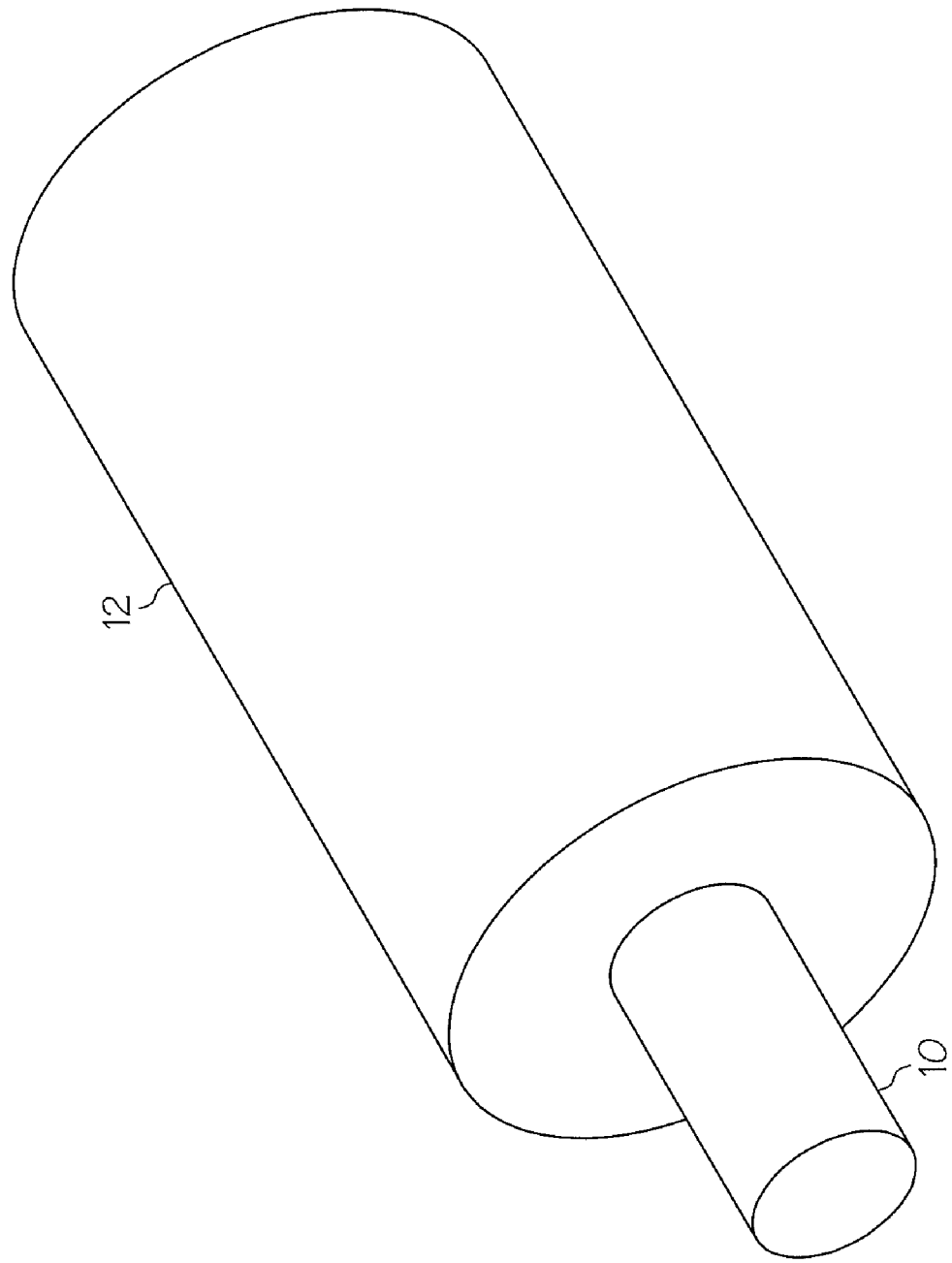

OPTICAL FIBER FOR PUMPING AND METHOD

BACKGROUND

In the hydrocarbon recovery industry, instrumenting and sensing are more and more regularly desirable. With the advent of optic fiber sensors and the ability to pump them into the downhole environment, operators desires for their use has only increased.

The art of pumping of fibers into the downhole environment is well known and thus its drawbacks and/or limitations have also become well know. For example, because pumping is generally accomplished utilizing a loop of tubular material such as a control line, the distance through which the fiber must travel is twice the distance from the surface to the target location downhole, one leg down and one leg back. This is potentially problematic as the target location becomes more remote (e.g. deeper) from the initiation or surface location. In order to maintain a tractive force on the fiber within the control line, a minimum velocity must be maintained in a carrier fluid. Viscous drag is the basis for the tractive force exerted on the fiber. With increasing distance, the amount of fiber implicated grows and this requires that the velocity of the carrier fluid increase also. With increasing length, however, frictional considerations become more significant until a practical limit is reached above which fiber pumping is simply not considered feasible. This is because there is a practical limit to how much pressure can be employed to drive fluid through the control line without simply bursting the control line at the source. No method has heretofore resolved this issue.

SUMMARY

A fiber optic cable includes at least one optic fiber; and a buoyancy modifying coating on the at least one optic fiber, the coating comprising at least one microballoon and a matrix material. A method for installing at least one optic fiber cable in a tubular includes coupling a fluid carrier to an optic fiber cable with viscous drag forces; pumping the fluid into a tubular structure having a downhole directed leg and an uphole directed leg; and displacing at least a portion of the mass of the cable independently of the pumping of the cable. A fiber optic cable pumping system includes a first tubular having a first inside dimension extending from a surface location to a downhole location; a second tubular having a larger inside dimension than the first inside dimension in fluid conveying communication with the tubular at the downhole location and extending back to the surface location; a fluid in the first and second tubulars; and a fiber optic cable being selectively buoyant in the fluid.

BRIEF DESCRIPTION OF THE DRAWINGS

FIG. 1 is a perspective schematic view of a portion of an optic fiber cable according to the teaching hereof.

DETAILED DESCRIPTION

In accordance with the present disclosure, it will be appreciated that an entirely different approach to the pumping length limitation has been successful in increasing distances over which fiber may be pumped. In addition, the teachings herein also allow for pumping pressure and fluid velocity for a conventional pumping distance to be reduced. Referring to FIG. 1, a perspective view of a portion of an optic fiber cable 10 (one or more fibers) modified such that the buoyancy of the fiber is controllable relative to the fluidic material that will act as a carrier fluid to pump the fiber through a tubular (not shown) such as, for example, a control line.

In one embodiment, an optic fiber cable 10 is coated with a buoyancy enhancing material 12 such as, for example, a microballoon bearing coating material. Such a material includes a number of microballoons, or microspheres (for example ureaformaldehyde type manufactured by Colton Chemical Company, Cleveland, Ohio, phenolic microballoons which are commercially available from a number of sources including, for example, www.fiberglasssupply.com, or glass microballoons made by 3M Corporation) disposed within a matrix of another material such as, for example, polytetrafluoroethylene material. The individual microballoons may be of sizes that range from about 20 microns to about 200 microns and may contain air, helium, or any other gas to selectively adjust the specific gravity of each individual sphere thereby affecting the overall buoyancy of the coating material and thus the cable 10. While many different depositable materials are employable, it is to be recognized that because an adjustment of buoyancy toward the positive buoyancy end of the spectrum is the desired end result, the material should not be particularly dense. In addition, because the cable is to be run in a downhole environment, a matrix material having properties resistant to environmental conditions downhole will be more effective. Yet further, materials having a low coefficient of friction enhance the concept disclosed herein by ensuring that contact between the cable 10 and an inside dimension of the tubular in which the cable 10 is pumped will have a minimum of frictional drag against the tubular. Polytetrafluoroethylene was noted above as one possible matrix material because it possesses all of the foregoing attributes.

The coating material resulting from admixture of the microspheres with the matrix material is in one embodiment deposited immediately on the cladding of a fiber cable 10. One of skill in the art will recognize that optic fibers include a cladding to enhance internal reflectance. Further disclosure in this regard is not necessary nor is it germane to the instant disclosure. In one embodiment, the material is applied to the cable 10 by an extrusion method common in the art of coating optic fibers. Since the method is commonly known, no further disclosure thereof is warranted or appropriate. In each embodiment, the microballoons have a density less than that of the carrier fluid, which may be hydraulic fluid, such that a neutral or greater buoyancy of the cable 10 in the carrier fluid is achieved. It will be noted, however, that the matrix material may or may not have a density greater than that of the carrier fluid. Generally, greater buoyancy is better until and unless the combination of components renders the buoyancy great enough to hinder the downhole trip under the viscous drag force of the moving fluid or causes a sufficient contact with a wall of a deviated segment of the tubular to increase a detrimental frictional component of the system enough to deter its desired operation. More specifically, if the buoyancy of the cable 10 is great enough to cause the cable to make any degree of pressured contact with a wall of the tubular, then contact friction in that location will detract from the viscous drag force thereby reducing efficiency of the system. Providing that the buoyancy does not reach levels that cause the system to reach the noted and similar difficulties, the greater the buoyancy, the better. This is because after the fiber is pumped to the downhole target location and begins its trek back uphole, the buoyancy of the cable 10 significantly reduces the reliance on viscous drag to be transported back to surface. In some embodiments, the return trip to surface requires no viscous drag at all as the fiber itself has sufficient buoyancy to float back to surface. This allows the added advantage that the tubular in which the cable is being pumped can be enlarged in cross section for the section of the tubular associated with the return trip to surface. While this will reduce the fluid velocity and would therefore be thought by one of ordinary skill in the art to be contraindicated, in connection with the cable as disclosed herein, the larger cross section tubular helps to reduce hydraulic frictional losses and reduces the input pressure needed at the surface of the downhole leg of the system. And because the fluid velocity is not necessary due to the buoyant condition of the cable, the operation is still successfully completed. Moreover, due to the buoyancy of the cable 10, it is less likely to "bunch up" in the tubular but rather is much more likely to remain substantially straight in the upward leg of the tubular. It is further to be understood, however, that although buoyancy is noted to be neutral or greater, it is to be appreciated that even a negative buoyancy overall that is more positive than the cable 10 without the buoyancy modifying coating is still better than without the modifying coating.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A fiber optic cable pumping system comprising:
   a first tubular having a first inside dimension extending from a surface location to a downhole location;
   a second tubular having a larger inside dimension than the first inside dimension in fluid conveying communication with the tubular at the downhole location and extending back to the surface location;
   a fluid in the first and second tubulars; and
   a fiber optic cable being selectively buoyant in the fluid.

2. The system as claimed in claim 1 further comprising a buoyancy modifying coating on the fiber optic cable, the coating comprising at least one microballoon and a matrix material.

3. The system as claimed in claim 1 wherein the cable is floated back to surface without need for viscous fluid drag in the second tubular.

4. The system as claimed in claim 1 wherein the fluid is more dense than the cable.

* * * * *